United States Patent
Haupt et al.

(10) Patent No.: US 6,786,541 B2
(45) Date of Patent: Sep. 7, 2004

(54) AIR DISTRIBUTION SYSTEM FOR VENTILATED SEAT

(75) Inventors: Gregory A. Haupt, Brighton, MI (US); Jeff Montgomery, Livonia, MI (US); Gary Reynolds, Northville, MI (US); Hilding Holcombe, Ypsilanti, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 248 days.

(21) Appl. No.: 09/755,637

(22) Filed: Jan. 5, 2001

(65) Prior Publication Data

US 2002/0096915 A1 Jul. 25, 2002

(51) Int. Cl.⁷ .................................................. A47C 7/72
(52) U.S. Cl. .............................. 297/180.1; 297/180.14; 297/452.46; 297/452.42
(58) Field of Search ........................ 297/180.11, 180.1, 297/180.13, 180.14, 452.43, 452.46, 452.47, 452.41

(56) References Cited

U.S. PATENT DOCUMENTS

| | | | |
|---|---|---|---|
| 374,424 A | 12/1887 | Ober | |
| 390,154 A | 9/1888 | Beach | |
| 1,370,832 A | 3/1921 | Mollberg | |
| 1,439,681 A | 12/1922 | Alkire | |
| 1,475,912 A | 11/1923 | Williams | |
| 1,514,329 A | 11/1924 | Metcalf | |
| 1,537,460 A | 5/1925 | Campbell | |
| 1,593,066 A | 7/1926 | Gaston | |
| 1,664,636 A | 4/1928 | Mayer | |
| 1,837,515 A | 12/1931 | Bachrach | |
| 1,936,960 A | 11/1933 | Bowman | |
| 2,022,959 A | 12/1935 | Gordon | |
| 2,103,553 A | 12/1937 | Reynolds | |
| 2,158,801 A | 5/1939 | Petterson | |
| 2,336,089 A | 12/1943 | Gould | |
| 2,493,303 A | 1/1950 | McCullough | |
| 2,544,506 A | 3/1951 | Kronhaus | |
| 2,703,134 A | 3/1955 | Mossor | |
| 2,749,906 A | 6/1956 | O'Connor | |
| 2,758,532 A | 8/1956 | Awe | |
| 2,782,834 A | 2/1957 | Vigo | |
| 2,791,956 A | 5/1957 | Guest | |
| 2,826,135 A | 3/1958 | Benzick | |
| 2,931,286 A | 4/1960 | Fry, Sr. | |
| 2,976,700 A | 3/1961 | Jackson | |
| 2,978,972 A | 4/1961 | Hake | |
| 2,992,604 A | 7/1961 | Trotman | |
| 2,992,605 A | 7/1961 | Trotman | |
| 3,030,145 A | 4/1962 | Kottemann | |
| 3,101,037 A | 8/1963 | Taylor | |
| 3,101,660 A | 8/1963 | Taylor | |
| 3,131,967 A | 5/1964 | Spaulding | |
| 3,136,577 A | 6/1964 | Richard | |
| 3,137,523 A | 6/1964 | Karner | |
| 3,486,177 A | 12/1969 | Marshack | |
| 3,529,310 A | 9/1970 | Olmo | |
| 3,628,829 A | 12/1971 | Heilig | |
| 3,681,797 A | 8/1972 | Messner | |
| 3,736,022 A | * 5/1973 | Radke | ......................... 297/453 |
| 3,757,366 A | 9/1973 | Sacher | |

(List continued on next page.)

Primary Examiner—Peter M. Cuomo
Assistant Examiner—Stephanie N. Harris
(74) Attorney, Agent, or Firm—Foley & Lardner

(57) ABSTRACT

A ventilated vehicle seat includes an imperforate foam air plenum member located in a foam cushion top. The air plenum member is assembled from a molded box-like foam member and an integrally molded cover. The air plenum has an air port for application of positive or negative pressure. The cover has apertures for air to pass into or out of the air plenum member. One preferred embodiment of the air plenum member includes an integrally molded portion that is assembled into an air conduit for said air port. The cover can have various sizes that are larger than the box-like member and can have inner and outer surface conformations to suit various purposes.

24 Claims, 5 Drawing Sheets

U.S. PATENT DOCUMENTS

| | | |
|---|---|---|
| 3,778,851 A | 12/1973 | Howorth |
| 3,948,246 A | 4/1976 | Jenkins |
| 4,002,108 A | 1/1977 | Drori |
| 4,060,276 A * | 11/1977 | Lindsay ..................... 297/180 |
| 4,072,344 A | 2/1978 | Li |
| 4,141,585 A | 2/1979 | Blackman |
| 4,175,297 A | 11/1979 | Robbins |
| 4,391,009 A | 7/1983 | Schild |
| 4,413,857 A | 11/1983 | Hayashi |
| 4,509,792 A | 4/1985 | Wang |
| 4,589,656 A | 5/1986 | Baldwin |
| 4,685,727 A | 8/1987 | Cremer |
| 4,712,832 A | 12/1987 | Antolini |
| 4,729,598 A | 3/1988 | Hess |
| 4,847,933 A | 7/1989 | Bedford |
| 4,853,992 A | 8/1989 | Yu |
| 4,866,800 A | 9/1989 | Bedford |
| 4,923,248 A | 5/1990 | Feher |
| 4,946,220 A * | 8/1990 | Wyon et al. ................ 297/180 |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,102,189 A | 4/1992 | Saito |
| 5,106,161 A * | 4/1992 | Meiller ..................... 297/453 |
| 5,160,517 A | 11/1992 | Hicks |
| 5,211,697 A | 5/1993 | Kienlein |
| 5,226,188 A * | 7/1993 | Liou ............................ 5/653 |
| 5,292,577 A | 3/1994 | Van Kerrebrouck |
| 5,335,381 A | 8/1994 | Chang |
| 5,354,117 A | 10/1994 | Danielson |
| 5,356,205 A | 10/1994 | Calvert |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,561,875 A | 10/1996 | Graebe |
| 5,590,428 A | 1/1997 | Roter |
| 5,597,200 A | 1/1997 | Gregory |
| 5,613,729 A | 3/1997 | Summer, Jr. |
| 5,613,730 A | 3/1997 | Buie |
| 5,626,386 A | 5/1997 | Lush |
| 5,626,387 A | 5/1997 | Yeh |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest |
| 5,833,309 A | 11/1998 | Schmitz |
| 5,833,321 A | 11/1998 | Kim |
| 5,902,014 A | 5/1999 | Dinkel |
| 5,918,930 A | 7/1999 | Kawai |
| 5,921,314 A | 7/1999 | Schuller |
| 5,921,858 A | 7/1999 | Kawai |
| 5,924,766 A | 7/1999 | Esaki |
| 5,924,767 A | 7/1999 | Pietryga |
| 5,927,817 A | 7/1999 | Ekman |
| 5,934,748 A | 8/1999 | Faust |
| 6,003,950 A | 12/1999 | Larsson |
| 6,019,420 A | 2/2000 | Faust |
| 6,059,018 A * | 5/2000 | Yoshinori et al. .............. 165/42 |

\* cited by examiner

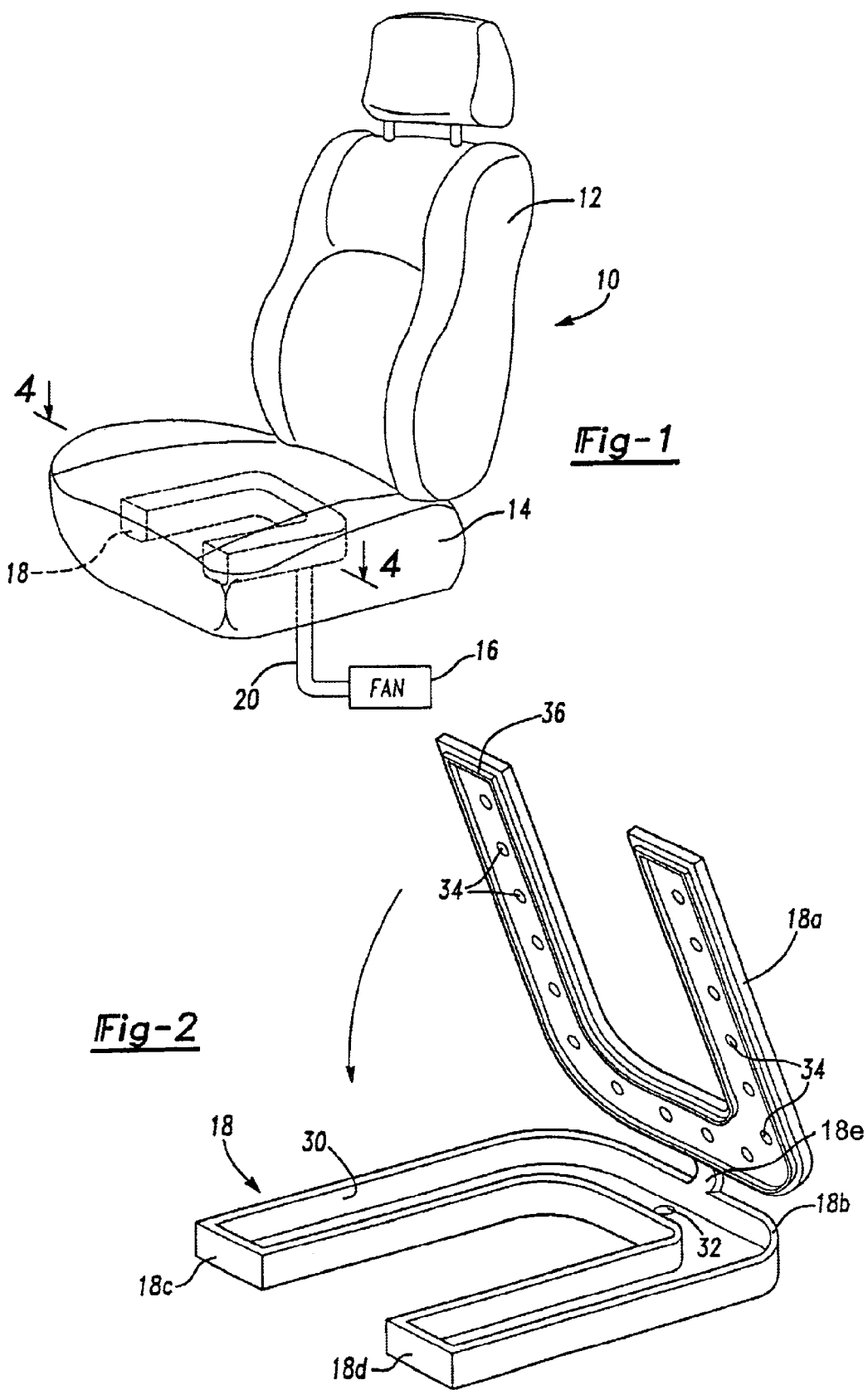

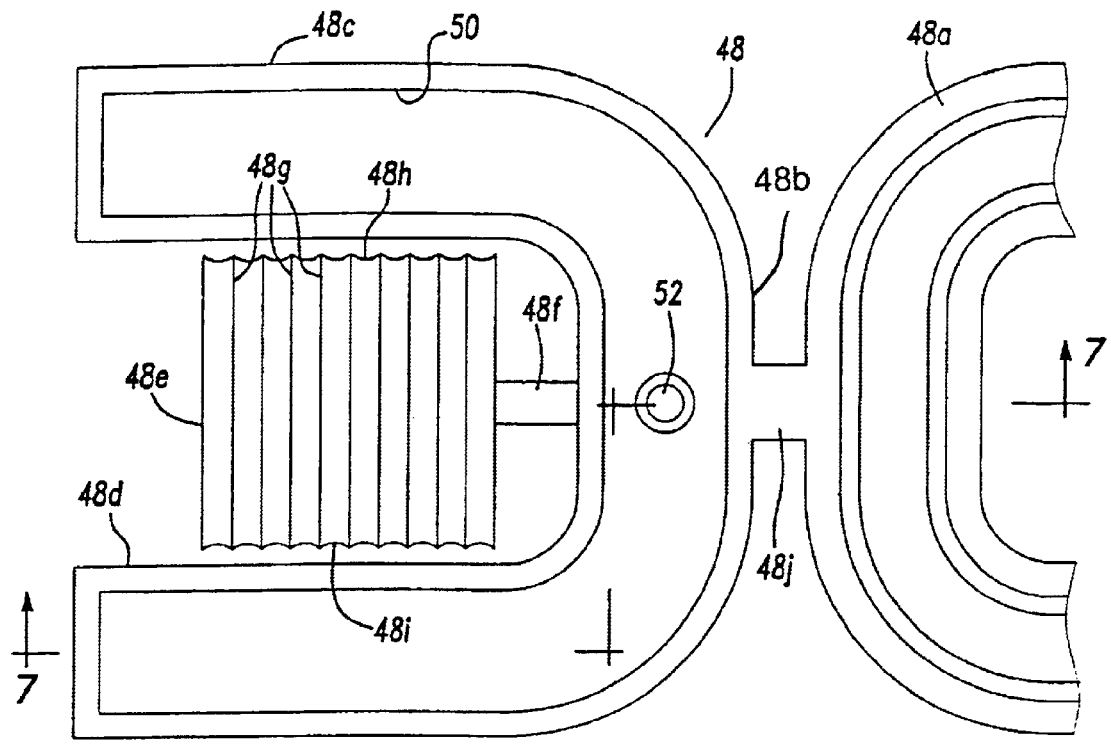
Fig-6
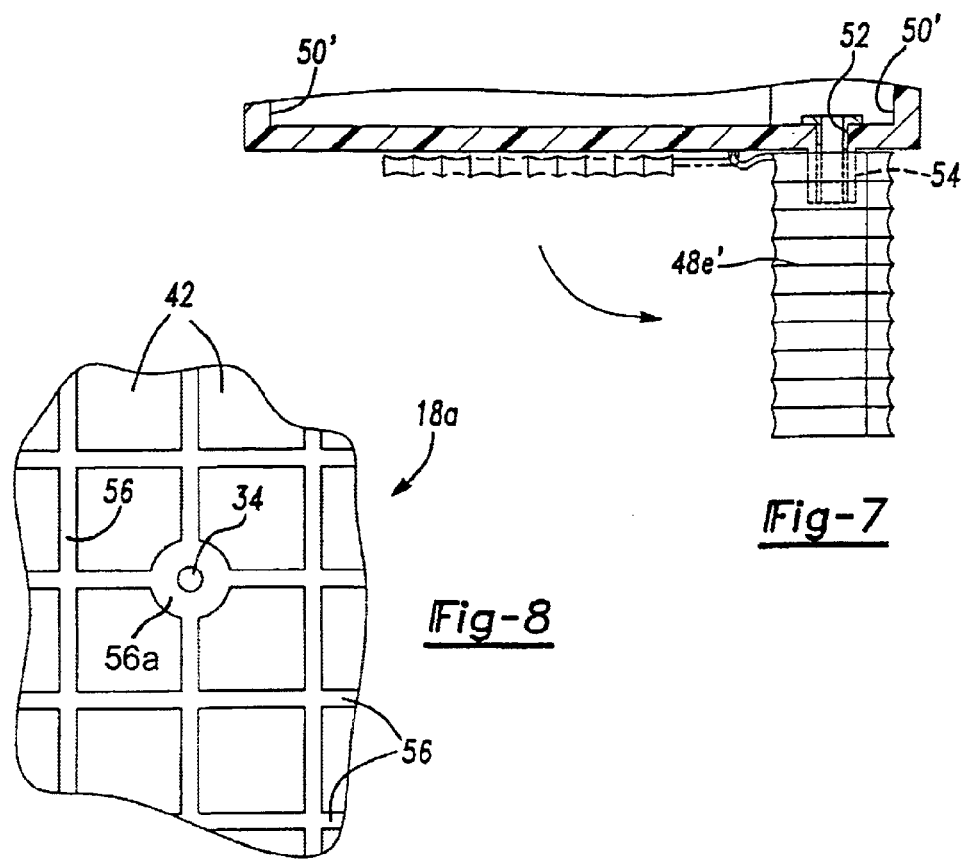
Fig-7
Fig-8

US 6,786,541 B2

AIR DISTRIBUTION SYSTEM FOR VENTILATED SEAT

TECHNICAL FIELD OF THE INVENTION

This invention generally relates to a ventilated seat for a vehicle. More specifically, this invention relates to a seat pad assembly of an air distribution system for a motor vehicle ventilated seat.

BACKGROUND OF THE INVENTION

One of the recent features associated with vehicle design is the ventilated seat. Ventilated seats in the past have used distribution devices and pad assemblies within the seat assembly to either push air into or draw air from the occupant area of the ventilated seat. The air distribution devices of current techniques in the art often use a plenum type distribution device in seat pad assemblies. The plenum can be formed as a channel in a high-density plastic foam seat cushion. For a bottom or seating cushion of the seat, the plenum could be an open-topped, horseshoe-shaped channel in the upper surface of the cushion. Respective open ends of the horseshoe-shaped channel would be sized and positioned to extend under the thighs of the seat occupant. The open top of the channel, and perhaps the entire surface of the cushion, might be covered with a highly porous but strong fabric that is bonded to the upper surface of the cushion, particularly at the edges of the channel. This fabric supports other layers that are applied over the top of the channel. The entire upper surface of the cushion is covered with highly porous plastic foam, such as open-celled foam, which is also referred to herein as reticulated foam. A decorative trim cover is bonded and/or sewn to the outer surface of the open celled foam. The trim cover might be a layer of a decorative porous fabric, or a decorative layer of some other material that is highly perforated at least over the plenum area. The trim layer and the porous foam layer allow air to flow readily into or out of the cushion channel. Providing means, such as a fan, to draw air from, or blow air into the cushion channel ventilates the seat.

Density of the foam for such a seat cushion has to be a high enough to prevent collapse of its air channels when the seat is occupied. This can entail a compromise in the seat comfort and style, and can unduly limit the amount and quality of comfort and style features that may be incorporated into the trim cover of the ventilated seat. The type of pad assembly described above can eventually show wear lines on the trim cover and read-through of the channels through the trim cover. In addition, the assembly of the various layers is labor intensive. Moreover, meticulous care in assembly, quality control and inspection is required to insure that such wear lines and read-through do not occur prematurely. In this invention, such wear lines and channel read-through in the trim can be at least significantly reduced, if not avoided entirely. In addition, the assembly process of the ventilated seat pad can be made less critical, and variations in quality avoided, which reduces overall cost of manufacture. Accordingly, the manufacturing process becomes more efficient, and problems with the look and feel of ventilated seats are reduced.

SUMMARY OF THE INVENTION

Accordingly, this invention provides for a ventilated seat that overcomes the problems and disadvantages of the prior techniques in the art. The invention also provides for an improved pad assembly for a ventilated seat. The pad assembly allows use of a non-rigid air distribution device, while substantially resisting pinching or reduction of the cross-sectional area of the air plenum in the seat pad cushion. Importantly, the invention reduces the development of wear lines and read-through on the trim layer. The invention also provides an improved assembly technique that reduces manufacturing cost and improves uniformity in the manufactured product, while still allowing use of a non-rigid plenum for air distribution.

Briefly, the invention involves a pad assembly for a ventilated seat. The pad assembly includes a cushion member having an insert member of higher density foam providing an air distribution plenum. A channel whose open top is closed by a high density foam cover forms the plenum in the higher density insert member. The covering member is preferably molded as an integral part of the insert member. A trim layer would ordinarily cover the cushion, including the insert and insert channel cover. An open-celled foam layer could be used between the decorative trim layer and the cushion, including the insert and insert channel cover, to facilitate lateral air distribution to or from the cushion plenum while the seat is occupied.

The high density foam covering member on the insert channel can include conformations on its inner, i.e., lower, surface to nest with the insert channel and/or to reinforce the covering member in the channel area. Conformations can be used on the outer, i.e., upper, surface and/or on the edges of the covering member for decorative, structural, and/or seating comfort purposes, and to obscure read through and/or wear lines in the trim at edges of the channel. The channel-covering member can be used to cover some or all of the cushion upper surface, depending on the fashion needs of the trim covering. The covering member has perforations over the insert channel to facilitate airflow through the covering member into or out of the overlying porous trim layer. Surface grooves and the like in the channel covering member can be used adjacent the perforations to facilitate lateral airflow to or from the perforations.

The cushion plenum is connected to means for supplying or removing air, which can be an outlet of the vehicle air conditioning system, or the outlet of a separate impeller, such as a fan under the seat. In the prior art, a separate soft but substantially air impermeable member is used as a connector between the seat cushion plenum and the fan or air conditioning outlet. In a preferred example of this invention, the connector member can take a new form. The connector member can be integrally molded in the higher density foam, as a unique flat shape, along with the insert member. The cushion insert would include a port from the insert channel with an external port collar, around which the connector member would be wrapped. The connector member would extend down through a hole in the seat cushion, to provide a good airflow tube for connection with the air flow means. Thus, the assembly can be done with fewer critical steps and fewer separate parts. Appearance and durability are maximized, and cost is reduced.

BRIEF DESCRIPTION OF THE DRAWINGS

Further features and advantages of the invention will become more apparent from the following discussion and from the accompanying drawings, in which:

FIG. 1 is an elevational view in perspective of a motor vehicle ventilated seat having an air plenum insert in its bottom cushion and an attached fan;

FIG. 2 is an elevational view in perspective of the bottom cushion insert for the seat of FIG. 1, illustrating that the insert has an open channel and an integrally molded perforated cover that is folded over on top of the channel;

FIG. 6 shows a schematic top view of an alternative embodiment of the invention in which the cushion insert includes an additional integral grooved flat portion that can be curled into a cylinder to form a flexible air conduit for attachment to an air port collar on the underside of the cushion insert;

FIG. 7 shows a schematic side view, in partial section, of the FIG. 6 cushion insert after the additional flat grooved portion is curled, bonded together, and affixed to the air port collar on the underside of the cushion insert;

FIG. 8 schematically shows an elevational fragmentary view of the addition of surface grooves on the upper surface of the insert cover that communicate with apertures over the insert channel.

DETAILED DESCRIPTION OF THE PREFERRED EMBODIMENTS

The following description of the preferred embodiment is merely exemplary in nature, and is in no way intended to limit the invention or its application or uses.

Figure 5:
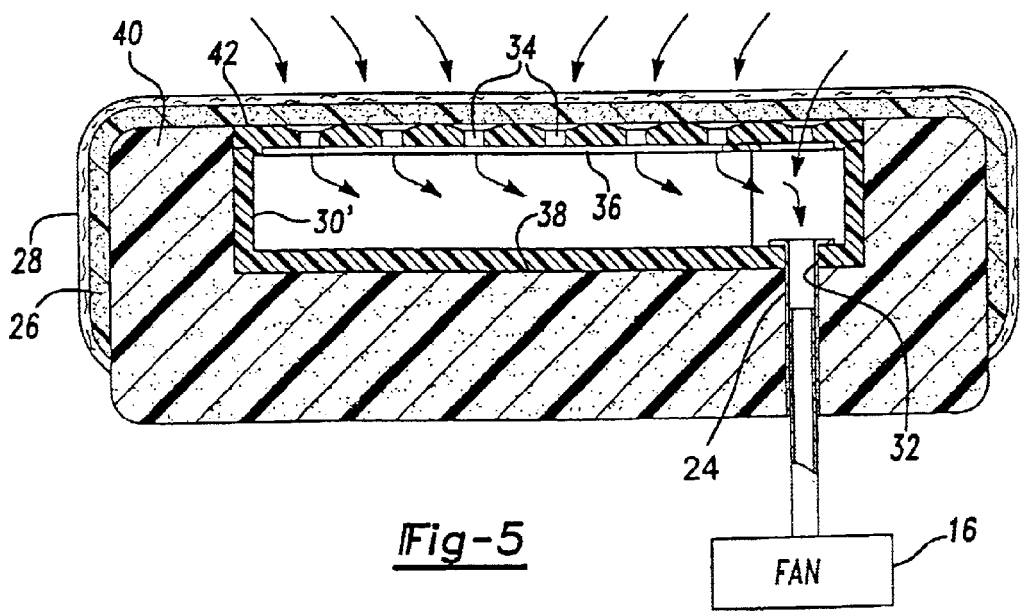
FIG. 5 shows a cross-sectional view of the FIG. 1 seat pad assembly along the line 5—5 of FIG. 4, to illustrate ambient air flow through the trim cover into or out of the air plenum and then to a fan.

As shown in FIG. 1, one preferred embodiment of the invention includes a ventilated seat 10 having a seat back 12, a ventilated seat bottom 14, and a fan 16. Fan 16 is connected to an air plenum member 18, shown in phantom line in FIG. 1, by means of an air conduit 20. Air plenum member 18 is a molded member that is shown in detail in FIG. 2. Air plenum member 18 is an air distribution or collection device for the seat bottom 14 into which it is inserted, depending on whether fan 16 produces positive or negative pressure in air conduit 20. More specifically, it is an air collection device if fan 16 rotates in one direction, to act as a suction or vacuum means. It is a forced air device if fan 16 rotates in the opposite direction, to act as an air pressurizing means. FIG. 5 shows a plenum member 18 as a collection device. However, it is contemplated that fan 16 could rotate to provide a positive pressure, and that it could even be replaced by a connection to a vehicle air conditioning outlet (not shown).

Seat back 12 could also have such an air collection/distribution device, and be connected to fan 16 by a branch in conduit 20. However, to better focus on the important aspects of the molded air plenum insert 18, and avoid unnecessary duplication in description, an air distribution/collection device is only shown as an insert in the seat bottom. It is to be noted that the following description could also apply to a seat back with an air collection/distribution device. It is also to be noted that for a seat back, the molded air plenum insert 18 might assume a different general geometrical shape than shown in the drawing. For example, it might simply be a rectangle, instead of a U-shape. In this connection, it is to be understood that the general U-shape for air plenum insert 18 is preferred when it is a seat bottom insert. However, other shapes could be used without departing from the spirit of the invention.

The ventilated seat 10 shown in FIG. 1 has been specifically illustrated as a bucket-type seat for a vehicle. The ventilated seat 10, however, may alternatively be used for a bench-type seat or other types of seat for a vehicle or for seats in other environments. Except for minor differences, the construction for the seat bottom 14 and the seat back 12 of the ventilated seat 10 are nearly identical. To avoid repetition, and better focus on the invention, only the construction of the seat bottom 14 for the ventilated seat 10 will be discussed in specific detail.

Reference is now made specifically to FIGS. 2–5. The seat bottom 14 is a pad assembly that includes a seat cushion 22, a molded air plenum insert 18 nested in the cushion 22, a substantially imperforate foam connector member 24, a porous foam overlayer 26, and a trim layer 28. The porous foam layer 26 and the trim layer 28 extend over the entire top 40 of cushion 22, to provide a continuous surface that obscures top surface lines of molded insert 18. Ordinarily, porous layer 26 and trim layer 28 would also extend down the sides of cushion 22, as shown in FIG. 5.

As is already known, trim layer 28 is preferably made from a durable air permeable material, such as a natural or synthetic fabric, perforated leather, or a perforated synthetic sheet material such as vinyl plastic. Trim layer 28 may alternatively be made from any other suitable material, such as müller cloth, that allows air to adequately pass through it, or which can be perforated to allow suitable air passage through it. Analogously, any of the known and accepted porous materials can be used for the porous layer 26. As indicated above, such a material would be an open-celled, or reticulated, plastic foam, such as urethane foam. As in prior ventilated seats, layer 26 is porous enough to let ventilating air readily pass through it but preferably dense enough to not completely compress when seat 10 is occupied. Such a foam material may be bonded to its overlying trim layer 28, to reinforce both layers and provide resistance to movement of trim layer 28 on the surface of porous layer 26. A conventional ventilated seat bonding means can be used, as long as it does not significantly restrict airflow through layers 26 and 28. Further, while porous layer 26 is preferably a urethane foam layer, it may alternatively be made with other suitable porous materials and, if desired, held in place on cushion 22 and under trim layer 28 by other techniques.

Cushion 22 is also a plastic foam material, such as urethane foam. Physically expanded plastics could also be used. However, it need not be porous. Thus it could be of open or closed cell foam, depending on the seat type involved. However, in most instances one would desire that cushion 22 be formed of lower density foam, to provide enough compression and memory that a significant comfort level results. A significant compression is highly desirable for comfort level. However, for ventilated seats, it might not be desirable. For example, significant compression is objectionable if airflow channels and/or air plenums are integrally formed in cushion 22. The channels and/or plenums can be deformed when the seat is occupied, and become restricted or even blocked entirely. Hence, in ventilated seat designs, one must compromise on the density of the foam used for cushion 22. This typically hurts either the seating comfort or ventilating effectiveness. In this invention, air plenum member 18 is inserted into cushion 22 to provide the air channels and plenum. It is most preferably made of higher density foam than cushion 22, so that it will not significantly compress within cushion 22 when ventilated seat 10 is occupied. Thus, in this invention, cushion 22 can be made using as soft a foam as is desired for comfort, without compromising ventilation effectiveness. Since ventilated seats are currently most likely to be used on luxury automobiles, where seat softness is usually very important, this invention can provide an improvement in both seating comfort and ventilation. However, it should be noted that the plenum member 18 and cushion can be made from the same material since the plenum top and base are separately sealed. In this situation, cushion 22 deformation can occur, causing movement of the entire plenum 18, without distortion of the air flow characteristics of the latter.

Air plenum member 18, as indicated above, is preferably made of resin foam too, such as urethane foam or an expanded plastic. However, in most instances, it would normally be preferable to make air plenum member 18 of urethane foam having a higher density than that of cushion 22. How much higher it should be will vary, depending on a variety of factors. What is important is that seat bottom 14 be as comfortable as is desired, and that air plenum member 18 not significantly compress when ventilated seat 10 is occupied. The required density will vary, for example depending on the thickness of cushion 22 relative to the thickness of air plenum member 18. It will also vary depending on the foam density, or softness, of cushion 22. In this latter connection, if cushion 22 has a density that will support some of the seat occupant load, air plenum member 18 would not have to be of as high a density. It is conceivable that in a ventilated seat for a sport automobile, a higher density foam may be used in cushion 22 for high seat firmness. In such a seat, the difference in foam density may not be as great as in a ventilated seat for a luxury automobile. Accordingly, in some instances, there might not be any significant difference in foam density between cushion 22 and air plenum member 18. While the foam density difference is most likely desired, it should be noted that the following discussion points out a number of other advantages to using our air plenum seat insert, in addition to avoiding the comfort/ventilation compromise referred to above. Some of these other advantages do not require a significant difference in foam density between air plenum member 18 and cushion 22. Among other advantages of this invention are an improvement in seat quality and durability by avoiding and/or obscuring initial and subsequent read through of the air channels, and subsequent wear lines on edges of the air channels. Other advantages lie in reduced manufacturing and/or assembly costs for a ventilated seat.

Air plenum member 18 is generally U-shaped, having a base 18b and connecting legs 18c and 18d for extending under a seat occupant's legs. Inner and outer walls on base 18b and legs 18c and 18d form an open-topped U-shaped channel 30. A cover 18a for channel 30 is integrally molded with base 18b, and has a U-shape complementary with base 18b and legs 18c and 18d. Cover 18a has an integral strap, or hinge, portion 18e. Hinge portion 18e is more of a short connecting strap than a "living" hinge. As can be seen from FIG. 2, channel 30 is closed by folding back cover 18a onto the top of base 18b and legs 18c and 18d by means of hinge 18e. Cover 18a is sealed completely around its periphery to the top edges base 18b and legs 18c and 18d, to form a substantially closed hollow interior, or air plenum, within molded member 18. Alternatively, complete closure need not be accomplished by pad design, but could occur when an occupant forces a compression fit top into the hollow bottom. In addition, the top could fold down into the bottom to form a relatively complete seal. Leakage is not necessarily a problem, but may even enhance the ventilation efficiency if it is relatively small.

The hollow interior, or air plenum, of air plenum member 18 is designated by reference numeral 30' in FIG. 5. Air plenum 30' has a port 32 for exit or entrance of air, depending on whether negative or positive pressure is used for ventilation. Cover 18a has at least one and preferably many apertures 34, through which air can pass into or out of air plenum 30', depending on whether ventilation is by negative or positive pressure. The number, size and shape of cover apertures 34 can vary widely without departing from the spirit of this invention. More will be said in this connection in the discussion that follows. However, ordinarily there will be many such cover apertures, and they will be located along the entire length of the cover. They may have a higher density in cover portions adjacent seat occupant portions requiring greater ventilation. For that matter, air plenum member 18, itself would have a general shape that allows it to extend along those portions of a seat occupant needing most ventilation. For a seat bottom, this would be under hips and legs of the seat occupant. It is for this reason that the drawing shows air plenum member 18 as U-shaped.

The bottom surface of cover 18a includes one or more conformations 36 that provide means to self align cover 18a over channel 30. In this example the conformation 36 is a continuous rib or ridge around the periphery of the bottom surface of cover 18a. Rib 36 nests inside the edge of channel 30, as shown in FIG. 5. The aligning conformation or conformations 36 can alternatively take many forms, from bosses that align with inner edges of channel 30, to transverse ribs extending across the underside of the cover. Transverse ribs may be preferred in some instances to reinforce the cover and provide more extended protection against read-through and channel edge wear on the overlying trim layer. In still another alternative, one might simply make the entire edge of cover 18a thinner, so that the thicker inner portion of the cover nests in channel 30, and thus self aligns on air plenum member 18. This latter alternative may be more desirable from an initial or subsequent appearance standpoint, but may require more perforations 34 in cover 18a in order to get satisfactory airflow through the cover. In this latter connection, the thickness of cover 18a can obviously vary widely, as can the wall thickness in base 18b and legs 18c and 18d. The preferred cover and wall thickness will depend on a variety of factors, including comfort, initial and subsequent appearance, and individual preferences, as well as the relative and absolute density of the foams respectively used for cushion 22 and air plenum member 18.

Figure 3:
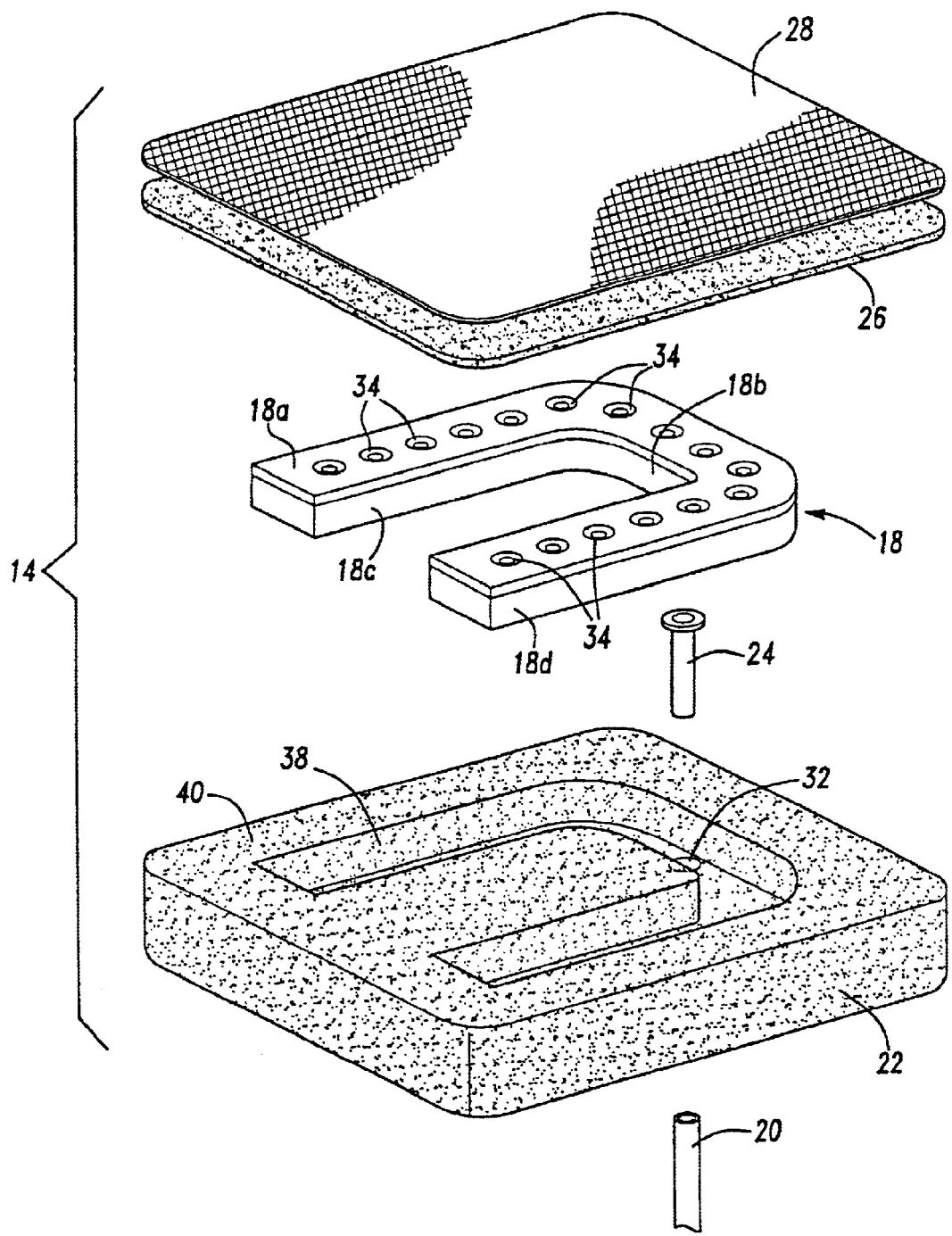
FIG. 3 shows an exploded view of the seat pad assembly for the ventilated seat illustrated in FIG. 1.
Figure 4:
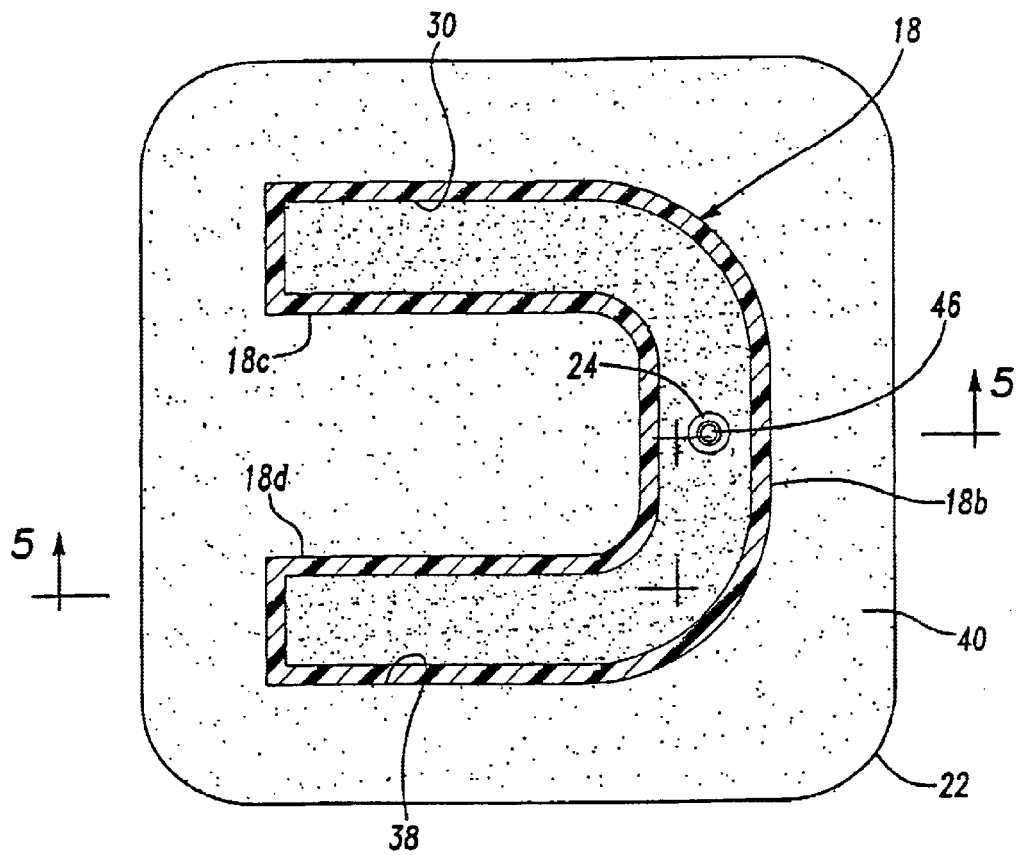
FIG. 4 shows a horizontal cross sectional view of the FIG. 1 seat pad assembly taken along the line 4—4 of FIG. 1, to illustrate nesting of the insert in the seat cushion and the interior of the cushion insert with its cover removed.

As seen in FIGS. 3–5, U-shaped air plenum member 18 nests in a conforming recess 38 in cushion 22. It can be adhesively bonded in place, to make substantially integral with cushion 22. Accordingly, air plenum member 18 will not move with respect to cushion 22. In other words, it moves uniformly with cushion 22, which masks its presence there. On the other hand, in a luxury seat especially, air plenum member 18 does not collapse like cushion 22. In addition, recess 38 is as deep or deeper than air plenum member 18 is high, so that the top surface 40 of cushion 22 and the top surface 42 of member cover 18a are flush. Hence, surfaces 40 and 42 provide a near-continuous support surface for surface foam layer 26 and trim layer 28. Thus, despite the openings 34 in cover 18a, trim layer 28 is not likely to reveal the presence of air plenum member 18 initially or after extended use. In addition, trim layer 28 is not likely to develop wear lines over air plenum member 18 after extended periods of occupant use.

While not shown in the drawing, a variety of heating arrangements can be incorporated into seat 10. They could range from air permeable electric heating elements embedded above or below foam layer 26 to an air heater located in air plenum 30', in air passage 20, or be associated with fan 16. If fan 16 were connected to the vehicle heating and air conditioning system, the heater for the air would be remotely located.

While also not shown in the drawing, cushion 22 would typically include a support, which could take many forms, as for example a seat pan, springs, webbing and the like. The support could have mechanical and/or electrical means to move the seat, fore and aft and up and down in the vehicle. As indicated above, conduit 20 provides an air conduit between fan 16 and air plenum member 18. Conduit 20 is preferably a flexible tube for most applications, to accommodate the fore and aft movement of the seat. As can be seen in FIGS. 4–5, the port 32 of air plenum member 18 is cylindrical and has a short cylindrical external extension, or flange. This extension facilitates making imperforate air connections to the air plenum member 18. A cylindrical imperforate soft foam connector element 24 is seated within port 32 and the port extension. Soft foam connector element 24 has a cylindrical central aperture 46. A cylindrical end on conduit 20 is disposed within the aperture 46 of connector 24. Aperture 46 has a smaller diameter than the end of conduit 20, so that soft foam connector 24 forms a seal around the end of conduit 20.

It is also to be understood that the ventilated seat 10 of FIG. 1 could include a control module, not shown, if desired, to allow selective adjustment of the speed of fan 16, and thus the ventilation of the ventilated seat 10. The control module might include a switch and a microprocessor or other comparable analog or digital circuits. Alternatively, control of fan 16 could be integral with the controls for heating and cooling ambient conditions in the vehicle.

Reference is now made to FIGS. 6 and 7, which show an alternative embodiment 48 of the air plenum member 18. FIG. 6 shows a view of air plenum member 48 with its cover before its cover 48a is folded over and bonded into place. Air plenum member 48 is similar to air plenum member 18. It is U-shaped and has an integral U-shaped cover 48a. Cover 48a is similar to cover 18a in FIG. 2. The U-shape of air plenum member 48 has a base 48b and legs 48c and 48d, and a U-shaped channel 50 extending from leg 48c to leg 48d through base 48b. U-shaped cover 48a is integrally molded with base 48b and legs 48c and 48d. Cover 48a is connected to base 48b by means of an integrally molded strap or hinge 48j. Hinge strap 48j allows cover 48a to be folded onto base 48b and legs 48c and 48d. When U-shaped cover 48a is in place, U-shaped channel 50 becomes air plenum 50', as indicated in FIG. 7. Details of air plenum member 48 are similar to details for air plenum member 18, except for added integral portion 48e and its integral strap, or hinge, 48f. Actually, in this embodiment, 48f is more of a connecting strap than a hinge. To avoid repetition, most of the details of air plenum member 48 that are similar to air plenum member 18 shall not be repeated. Instead, we shall focus on how air plenum member 48 differs from air plenum member 18. It differs primarily in the presence of the extra integrally molded portion 48e and its connecting strap 48f.

FIGS. 6–7 shows that as molded, portion 48e is a flat element that has transverse grooves 48g in its upper surface. Portion 48e is thin enough to be readily bent into a cylindrical form. It can be conveniently bent, or curled, around a cylindrical mandrel of appropriate diameter. When so wrapped around a mandrel, opposed edges 48h and 48i of portion 48e overlap. They are then bonded together to form a cylinder, which is designated by reference numeral 48e' in FIG. 7. An adhesive that instantly bonds upon contact of the mating surfaces could be used or if a suitable thermoplastic resin is used, heat can be used to form the bond. Cylinder 48e' is characterized by having a longitudinal seam (now shown), and replaces conduit 20 of FIG. 1. Assembly costs of air plenum member 48 are reduced because it can be shipped in unassembled form, its assembly is a non-critical operation, and when shipped, it includes its own air conduit to fan 16. Inclusion of the air conduit 48e' as an integral part of air plenum member 48 means that no additional part, such as air conduit 20, need be separately purchased, stocked and shipped.

Grooves 48g in the surface of cylinder 48e' aid in making cylinder 48e' more flexible, so that it resists pinching when bent. Like air plenum member 18, the bottom of air plenum member 48 has a port 52 and an external collar 54 surrounding the port 52. Collar 54 is present to facilitate attachment of the end of cylinder 48e' to port 52 of air plenum member 48.

Cylinder 48e' can be assembled in place by wrapping flat portion 48e tightly around collar 54 so that opposed edges 48h and 48i overlap. Edges 48h and 48i are bonded together, which forms a longitudinal seam (not shown) on the resulting cylinder 48e'. When so wrapping 48e around collar 54, the end of cylinder 48e' might be bonded directly to collar 54 without using any interjacent foam seal. On the other hand, the end of cylinder 48e' could be bonded to a foam ring (not shown) around the outside of collar 54. If so, the foam ring may or may not be adhesively bonded to collar 54. It is to be recognized that in some instances it may be preferred not to affix the end of cylinder 48e' permanently in place. The end of cylinder 48e' could be retained on collar by friction or by a clamp, so that it is readily removable. As for forming cylinder 48e', it could be preformed by first forming it around a mandrel, and then affixing it to collar 54. Alternatively, the mandrel could have a smaller diameter end that could be inserted into port 52, flat portion 48e wrapped around the mandrel, and the mandrel removed after cylinder 48e' is formed. In this connection it is contemplated that collar 54 can partially or wholly serve as the forming mandrel for cylinder 48e', and that for this purpose one might want to give collar 54 some additional extension over that shown in the drawing. It is also to be understood that collar 54 could also have an internal extension, or only have an internal extension, or that port 52 have no reinforcing collar. Also, it is conceivable that cylinder 48e' could be affixed to port 52 by being inserted within collar 54. If so, strap 48f would be previously cut off, or the interior of port 52 be configured to accommodate strap 48f, to produce a form a good seal around cylinder 48e'. Such an internal connection has the advantage that it might not need adhesive to hold it in place. If strap 48f were cut and cylinder 48e' not adhesively bonded to the interior of port 52, cylinder 48e' would be a readily movable connection for later service or maintenance of the vehicle seat 10. In this latter regard, it is recognized that there may be a variety of still other reasons to cut off either or both of integral straps 48f and 48j before, during, or after assembly of air plenum member 48.

FIG. 8 shows a fragmentary elevational view of a modification of the upper surface 42 of air plenum member 18. The FIG. 8 view shows a portion of surface 42 surrounding an aperture 34 in cover 18a. This view illustrates that various surface conformations or contours can be incorporated into surface 42. They can be included for function reasons, for aesthetic reasons, or both. In the FIG. 8 modification, the surface contouring provides both functional and aesthetic advantages. The contouring is provided by a grid-like pattern of interconnected channels on cover surface 42 that communicate with aperture 34. In this example, the interconnected channels not only surround aperture 34 but also extend across cover surface 42 to the adjacent apertures (not shown). This facilitates airflow of air to and from aperture underneath porous foam layer 26 (not shown in this view). Airflow is facilitated even more by having channel portion 56a encircle aperture 34, and the grid-like pattern extend from channel portion 56a. Still further, channel portion 56a would preferably be deeper than outlying channel portions. Grid portions contiguous circular portion 56 would be as deep but become shallower as they become further removed from circular portion 56a. The grid-like pattern provide conformations in surface 42 that can reinforce cover 18a over channel 30, and can help mask read-through of apertures 34, and/or the edges of cover 18a. Analogously, the surface pattern in cover 18a can help mask eventual wear lines due to apertures 34 and/or the edges of cover 18a. It is not believed that wear lines due to the apertures is particularly important, unless one decides to use rather large apertures. It should be recognized that the surface conformations need not be interconnected grid lines, and need not extend from aperture to aperture from a functional standpoint. On the other hand, for aesthetic reasons, it might be desirable to extend the pattern entirely across the cover 18a. It should also be recognized that the conformations on surface 42 could assume many forms, not just the grid lines 56 that are shown. All such forms are contemplated in this invention, including patterns that have an individual conformation around each aperture, such as a starburst pattern.

Figure 9:
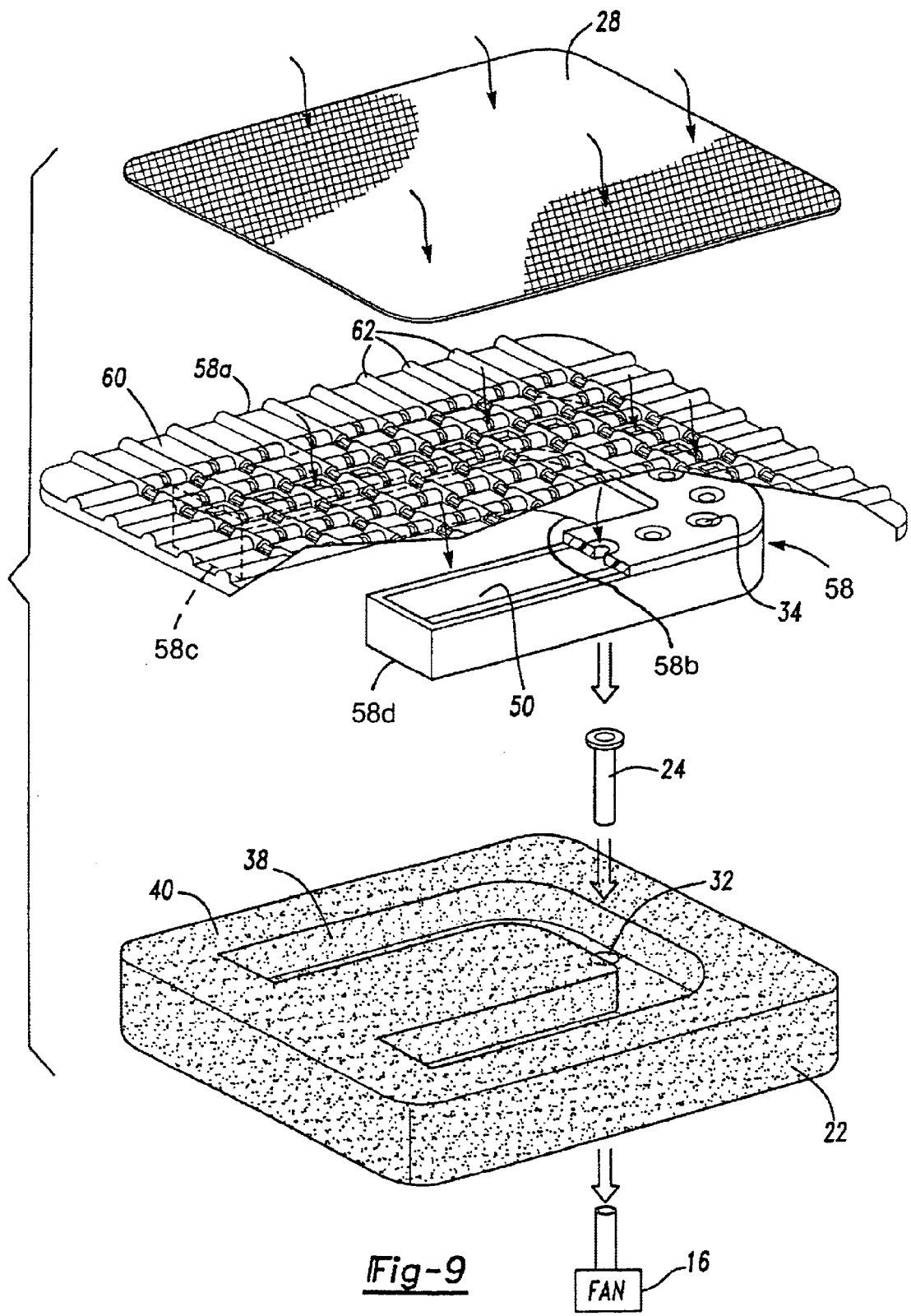
FIG. 9 schematically shows still another alternative embodiment of the invention in which the insert cover is about as large as the seat bottom cushion, so that it provides a substantially continuous surface over the entire surface of the bottom seat pad assembly.

As to masking read-through and/or wear lines due to cushion features underlying the porous layer 26 and trim layer 28, in some instances, it may be desirable to take more drastic measures. Such more drastic measures are illustrated in FIG. 9. FIG. 9 shows still another embodiment of the invention, in which the cover of our cushion insert is much larger than insert. It is as large as the entire top 40 of cushion 22, and perhaps larger, so that it can extend down along the sides of cushion 22. FIG. 9 shows a U-shaped air plenum 58 and a cushion 22. Cushion 22 in FIG. 9 is that same as cushion 22 in FIGS. 3–5, and will not be described again, to avoid unnecessary duplication. U-shaped air plenum member 58 is the same as U-shaped air plenum member 18 except for cover 58a. To avoid unnecessary duplication similarities shall not be repeated. Instead the following discussion shall focus on differences in cover 58a from cover 18a.

It is important to mention that cover 58a, like cover 18a, is integrally molded with its associated U-shaped channel member and is connected by means of a short integrally molded hinge or short strap (not shown in FIG. 9). While not shown, it would be helpful to include self-aligning means on the underside of cover 58a, such as used on the underside of cover 18a. One reason for including FIG. 9 in the drawing is to simply illustrate that the size of cover 18a could vary from the minimum needed to close channel 30, up to a size that covers the entire cushion 22. It could also be of an intermediate size and have edges that register with a masking conformation or stitch line in the overlying trim layer 28. FIG. 9 also illustrates more fully that surface conformations in cover 58a or cover 18a could extend entirely across cover 58a or 18a, regardless of its relative size with respect to cushion 22. FIG. 9 also shows that the type of surface conformations contemplated herein is not limited to indentations or grooves. They can be embossments, and do necessarily have to facilitate lateral airflow across the entire top 40 of cushion 22.

On the other hand, it is contemplated that a pattern of surface conformations can in fact facilitate lateral airflow to or from apertures in air plenum member 58 under certain types of trim layers. For example, if the trim layer 28 (not shown in FIG. 9) is relatively stiff, such as leather, a pattern of grooves and/or embossments on the top surface of cover 58a can be effective in laterally collecting or distributing air from the air plenum 58. In such instance, the porous layer 26 (not shown in FIG. 9) could be eliminated from the seat assembly, reducing assembly and material costs of the seat even further. FIG. 9 shows a pattern of embossments 62 that are exaggerated in their height, width and spacing to better show how air might laterally flow out from the underlying air plenum 58 along surface 60 of cover 58a. As indicated above, the surface conformations can be just about anything that will facilitate lateral airflow. Accordingly, it is to be understood that they are not limited to the pattern shown. It should also be understood that the surface conformations might be relatively minor height surface conformations, as for example a reticulated network or other interconnected network such as deep and laterally condensed leather-like grain.

It should also be mentioned that a variation to cover 58a could be used. Cover 58a could be larger than the bottom portion 58b, 58c and 58d of the air plenum member but not so large as to completely cover the upper surface 40 of cushion 22. Cover 58a might overlap onto the top 40 of cushion 22 to some lesser extent. For example, it might only overlap sufficiently to have its edge register with an overlying contour line in the trim layer 28. The contour line in the trim layer 28 might be an embossment, a stitched or bonded seam, or merely a stitch line. In another example of partial cushion coverage, cover 58a might overlap onto cushion 22 only a small amount, but not onto the top surface 40 of cushion 22. The top surface 40 of cushion 22 could have a shallow recess to accommodate it. In this latter instance the overlapping cover part would be nested in the recess, and it edges might not have to align with an overlying contour in the trim layer 28. In this latter connection, the overlap might be adhesively bonded to the shallow recess, to further improve seat pad durability by adding a lateral support to the air plenum cover. The lateral support could help prevent eventual read-through of the air chamber in the air plenum member and/or wear lines at edges of the air plenum member.

Product advantages are not the only advantages of this invention. This invention also provides other manufacturing advantages, some of which have been referred to above. It has already been mentioned that the integration of the air conduit 20 into the air plenum member 48, as portion air plenum member 48, eliminates a separate purchasing, stocking and shipping cost for air conduit member 20. In addition, it should be mentioned that in popular current ventilated seat designs, air distribution passages are valleys cut into the top 40 of cushion 22. In order to mask these valleys, porous layer 26 and trim layer 28 must be very carefully stretched over the outer surface 40 of cushion 22. This is a meticulous step that requires a special balance in tension of the layer 26 and 28. They have to be stretched tightly enough to mask the presence of the cushion valleys, and yet not so tight as to diminish the comfort level design for the resultant finished seat pad. Meticulousness of this type in automotive assembly undesirably slows seat assembly, and increases cost. Further, such an operation involves critical balances that are not always met, resulting in rejects that have to be remanufactured or discarded, which adds further to manufacturing cost.

In this invention, one can easily fold the plenum cover over and bond it in place. The forming of recess 38 in cushion 22, placement and bonding of air plenum member 18 in recess 38 are non-critical steps too, which should not produce many rejects. Yet they produce a substantially continuous seat pad surface. Such a surface can be easily covered by layers 26 and 28 quickly and with little criticality, which inherently leads to a low reject rate. Rate of assembly therefore increases, average initial quality goes up, and assembly costs go down. Still further, as indicated above, this invention covers the air distribution channels in the seat pad with a cover. The cover inhibits sagging of the trim layer 28 into the air distribution channels in the seat pad after extended seat use, and/or can mask any such read-through in trim layer 28. The channel cover also inhibits eventual formation of wear lines. Accordingly, seat durability is improved, which can reduce warranty costs.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A ventilated seat that comprises:
   a resilient cushion member made of a foam and having a cushion surface;
   a recess in said cushion surface;
   and air plenum member in said recess and being and air-imperforate foam;
   said air plenum member having an open-topped bottom portion and a cover forming a substantially closed air chamber that cooperates with said resilient cushion member to form a substantially continuous resilient seat surface;
   an air port to said air chamber;
   means for coupling said air chamber with a source of air pressure;
   apertures in said cover and communicating with said air chamber;
   a trim layer covering said resilient seat surface and said cover;
   a positive pressure source or a negative pressure source for passing air through said apertures in said cover.

2. The ventilated seat of claim 1, wherein:
   said air port to said air chamber in said air plenum member is an opening in said bottom portion of said air plenum member;
   said air port has a collar; and
   said cover has conformations on at least one of an inner surface and an outer surface.

3. The ventilated seat of claim 2, wherein said conformations are on the inner surface of the cover and are for at least one of cover reinforcement and alignment of said cover on said bottom portion.

4. The ventilated seat of claim 1, wherein:
   said bottom portion and cover are of a higher density foam than said cushion member foam; and
   said cover is made of the same foam that forms said bottom portion.

5. The ventilated seat of claim 4, wherein said means for coupling said air chamber with a source of air pressure includes an air conduit made from the same foam that is used to form said bottom portion.

6. The ventilated seat of claim 4, wherein said air plenum member is fully nested within said resilient cushion member so that a top surface of said air plenum member is substantially flush with a top surface of said resilient cushion member to provide said substantially continuous seat pad surface.

7. The ventilated seat assembly of claim 6 further comprising means for allowing air to pass through said trim layer and communicate with said apertures includes a reticulated foam layer disposed between said trim layer and said resilient seat surface that provides air communication between said trim layer and said apertures.

8. The ventilated seat assembly of claim 7, wherein said means for allowing air to pass through said trim layer and communicate with said apertures also includes perforations in said trim layer near said apertures.

9. The ventilated seat assembly of claim 7, wherein said means for allowing air to pass through said trim layer and communicate with said apertures also includes conformations on said air plenum member adjacent said apertures.

10. The ventilated seat assembly of claim 7, wherein;
    said means for allowing air to pass through said trim layer and communicate with said apertures includes both perforations in said trim layer and conformations on said air plenum member adjacent to said apertures; and
    said air plenum member and said resilient cushion member are both made of urethane foam.

11. The ventilated seat assembly of claim 1, wherein:
    said bottom portion and cover are of higher density foam than said cushion member foam;
    said air plenum member is only partially nested in said recess;
    said cover has at least one part that is larger than said bottom portion; and
    said cover overlaps a top surface of said resilient cushion member.

12. The ventilated seat assembly of claim 11, wherein said air air plenum member and said resilient cushion member are made of urethane foam.

13. The ventilated seat assembly of claim 11, wherein said cover that overlaps onto said resilient cushion member has at least one outer edge registered with a conformation in said trim layer.

14. The ventilated seat assembly of claim 12, wherein said cover that overlaps onto said top surface completely covers said top surface, so as to cooperate therewith by using said top surface as a support for a substantially continuous seat pad surface.

15. The ventilated seat assembly of claim 13 in which said means for allowing air to pass through said trim layer and communicate with said apertures includes a reticulated foam layer disposed between said trim layer and a seat pad surface that provides air communication between said trim layer and said apertures.

16. The ventilated seat assembly of claim 13 in which said means for allowing air to pass through said trim layer and communicate with said apertures also includes surface conformations on said top surface of said air plenum member adjacent said apertures.

17. The ventilated seat assembly of claim 13 in which said means for allowing air to pass through said trim layer and communicate with said apertures also includes perforations in said trim layer at least near said apertures.

18. The ventilated seat assembly of claim 13 in which:

said means for allowing air to pass through said trim layer and communicate with said apertures also includes both perforations in said trim layer near said apertures and surface conformations on said top surface adjacent said aperatures; and said trim layer includes a layer of leather.

19. A ventilated seat that comprises:

a resilient cushion member made of a foam having a first surface;

a recess in the first surface of the resilient cushion member;

a resilient air plenum member made of an air-imperforate foam and comprising an open-topped bottom portion and a cover having a plurality of apertures, the resilient air plenum member disposed in the recess and having at least one air chamber that communicates with the plurality of apertures and a second surface that cooperates with the resilient cushion member to form a substantially continuous resilient seat surface;

an air port for coupling the air chamber with a source of air pressure adapted to provide at least one of a positive pressure and a negative pressure; and a trim layer covering the resilient seat surface.

20. The ventilated seat of claim 19, wherein the air port is an opening in said open-topped bottom portion of the air plenum member, the air port having a collar and the cover having conformations on at least one of an inner surface and an outer surface.

21. The ventilated seat of claim 20, wherein the conformations are on the inner surface of the cover and are for at least one of cover reinforcement and alignment of the cover.

22. The ventilated seat of claim 19, wherein the air-imperforate foam is of a higher density than the foam of the resilient cushion member.

23. The ventilated seat of claim 19, further comprising an air conduit communicating with the air port.

24. The ventilated seat of claim 19, wherein the air plenum member is only partially nested in the recess, and the cover has at least one part that is larger than the open-topped bottom portion; and the cover overlaps a top surface of said resilient cushion member.

* * * * *